United States Patent
Kawabuchi et al.

(10) Patent No.: US 7,286,252 B2
(45) Date of Patent: Oct. 23, 2007

(54) PRINTING SYSTEM WITH ENHANCED EFFICIENCY IN POWER-SAVING, PRINTER, SUBSTITUTE SERVER, AND METHOD AND PROGRAM USED BY THE SUBSTITUTE SERVER

(75) Inventors: Yoichi Kawabuchi, Itami (JP); Shoji Imaizumi, Shinshiro (JP); Yoshikazu Ikenoue, Itami (JP)

(73) Assignee: Minolta Co., Ltd., Osaka-Shi, Osaka (JP)

( * ) Notice: Subject to any disclaimer, the term of this patent is extended or adjusted under 35 U.S.C. 154(b) by 960 days.

(21) Appl. No.: 10/108,898

(22) Filed: Mar. 29, 2002

(65) Prior Publication Data
US 2002/0144023 A1 Oct. 3, 2002

(30) Foreign Application Priority Data
Mar. 30, 2001 (JP) ............................. 2001-102618

(51) Int. Cl.
*G06F 3/00* (2006.01)
(52) U.S. Cl. ...................... 358/1.15; 358/1.1; 709/203; 710/5
(58) Field of Classification Search ................ 709/203; 358/1.1, 1.15; 710/5; 713/310
See application file for complete search history.

(56) References Cited

U.S. PATENT DOCUMENTS 6,134,401 A * 10/2000 Yun et al. ..................... 399/70

2005/0094184 A1 * 5/2005 Suyehira .................... 358/1.14

FOREIGN PATENT DOCUMENTS

| EP | 0924593 A2 | 6/1999 |
|---|---|---|
| JP | 05175964 | 7/1993 |
| JP | 05-284672 | 10/1993 |
| JP | 06-223017 | 8/1994 |
| JP | 08278859 | 10/1996 |
| JP | 09247194 | 9/1997 |
| JP | 10-124267 | 5/1998 |
| JP | 11277851 | 10/1999 |
| JP | 11289419 | 10/1999 |
| JP | 2000-094793 | 4/2000 |
| JP | 2001-075687 | 3/2001 |

* cited by examiner

*Primary Examiner*—Thomas D. Lee
(74) *Attorney, Agent, or Firm*—Buchanan Ingersoll & Rooney PC

(57) ABSTRACT

A printing system is provided in which a printer and a server are connected to a network. The server performs service to a terminal on behalf of the printer after the start of the printer activation and before the completion thereof, the service being such as instructing printing and receiving print data. The server, after receiving a completion notification of activation from the printer, instructs the terminal to suspend a print sequence, transfers, to the printer, the print data received on behalf of the printer, and instructs the terminal to cancel suspending the print sequence.

29 Claims, 18 Drawing Sheets

Fig.4

| PA | SFD | DESTINATION ADDRESS | SOURCE ADDRESS | LENGTH | LLC HEADER | DATA | FCS |
|----|-----|---------------------|----------------|--------|------------|------|-----|
| 7  | 1   | 6                   | 6              | 2      | 46~1,500   |      | 4   |

PA  : PREAMBLE:REPETITION OF "10101010"
      (USED FOR ESTABLISHING SYNCHRONIZATION)
SFD : FRAME START DELIMITER:"10101011"
FCS : FRAME CHECK SEQUENCE (CRC)

Fig.18

(A) ADDRESS MANAGEMENT TABLE BEFORE IMPERSONATING

| IP ADDRESS | MAC ADDRESS | EXISTENCE OF OVERLAPPING ADDRESS | HOST NAME |
|---|---|---|---|
| 192.168.0.1 | 00:00:00:00:00:01 | ADDRESS IN NORMAL STATE | SUBSTITUTE SERVER |
| 192.168.0.2 | 00:00:00:00:00:02 | ADDRESS IN NORMAL STATE | PRINTER |
| 192.168.0.3 | 00:00:00:00:00:03 | ADDRESS IN NORMAL STATE | PRINTER MANAGEMENT TERMINAL |
| 192.168.0.4 | 00:00:00:00:00:04 | ADDRESS IN NORMAL STATE | NETWORK MANAGEMENT TERMINAL |

(B) ADDRESS CONTROL TABLE DURING IMPERSONATING

| IP ADDRESS | MAC ADDRESS | EXISTENCE OF OVERLAPPING ADDRESS | HOST NAME |
|---|---|---|---|
| 192.168.0.1 | 00:00:00:00:00:01 | ADDRESS IN NORMAL STATE | SUBSTITUTE SERVER |
| 192.168.0.2 | 00:00:00:00:00:01 | ADDRESS IN NORMAL STATE | PRINTER ← IMPERSONATING |
| 192.168.0.2 | 00:00:00:00:00:02 | ADDRESS OVERLAPPING | PRINTER |
| 192.168.0.3 | 00:00:00:00:00:03 | ADDRESS IN NORMAL STATE | PRINTER MANAGEMENT TERMINAL |
| 192.168.0.4 | 00:00:00:00:00:04 | ADDRESS IN NORMAL STATE | NETWORK MANAGEMENT TERMINAL |

PRINTING SYSTEM WITH ENHANCED EFFICIENCY IN POWER-SAVING, PRINTER, SUBSTITUTE SERVER, AND METHOD AND PROGRAM USED BY THE SUBSTITUTE SERVER

This application is based on Patent Application No. 2001-102618 filed in Japan, the content of which is hereby incorporated by reference.

BACKGROUND OF THE INVENTION (1) Field of the Invention

The present invention relates to a network printing system which receives a print request from a terminal through the network and which performs printing in response to the print request. The present invention further relates to a printer and a server (substitute server) used in the network printing system, a method performed by the server for substituting for the printer, and a program making the server execute the method of substituting for the printer. In particular, the present invention relates to a power-saving technology realized by the mentioned system.

(2) Related Art

It has been not only a request of users but also a demand from an environmental viewpoint to reduce consumption power while a printer is in a wait state. Usually, it is a tradeoff between the convenience of users and how much power is to be reduced in a wait state. Specifically, a power reduction at the fixing unit will generate a waiting time for users, and disconnection to a network disables a remote access from the network. In the conventional network environment, it is a usual wait state in which, in the absence of any print request for a predetermined period of time, a power consumption by the fixing unit is reduced, while maintaining a connection to a network.

In the above-mentioned conventional wait state, when a remote terminal requests a printing, the wait state will end automatically, so as to start heating the fixing unit rapidly to reach a temperature required for starting printing. In this wait state, power continues to be consumed by the driver for the LAN interface that is installed inside the printer, such as a PCI card. As a result, there is a limitation for power-saving and it becomes impossible to respond to the need to save enough power.

SUMMARY OF THE INVENTION

The first object of the present invention, in view of the stated problems, is to provide a printing system with increased usage value, the printing system being able to shut out the network connection in a wait state, while at the same time being structured to receive an activation request by remote access, therefore being able both to save enough power in the sleep state and to make a swift transition to a ready state to be able to start printing. The second object of the present invention is to provide a printer used in the printing system, and the third object of the present invention is to provide a server which substitutes for the printer in the printing system. Further, the fourth object of the present invention is to provide a method used by the substitute server for performing service on behalf of the printer. Lastly, the fifth object of the present invention is to provide a program for making the substitute server execute the method.

The first object is achieved by a printing system including: a printer; a first network which is connected to the printer and through which a printing instruction is given to the printer; and a second network which is connected to the printer and through which an activation instruction is given to the printer.

According to the structure, when the printer has been brought to a sleep state without receiving any operation request for a predetermined time period, the power will be shut off from the main printer body and the connection between the network will be cut off. This means that the printer will not be recognized from a terminal in the sleep state. However, there is another network through which the terminal can make an activation instruction to the printer. Therefore, the system can realize both of power saving and remote access at the same time.

Here, the printer may include: a print control unit which is connected to the first network and controls printing operation of the printer according to the printing instruction received through the first network; and a power management unit connected to the second network, which is supplied power when an activation instruction is received through the second network, which then starts activating.

According to the structure, the power management unit keeps away from power until the printer receives an activation instruction, which enhances power-saving ability.

Here, the second network may be a power line.

According to the structure, since a power line also serves as a network, wiring will be made simple.

Here, the printing system may further include a server connected to the first and second networks, which performs service to a terminal on the first network, on behalf of the printer while the printer is in a sleep state.

According to the structure, when the terminal makes a connection inquiry to the printer in the sleep state, the printer will be assured to be recognized by the terminal, due to the impersonating transaction by the server.

Here, the server may route the printer activation instruction from the first network to the second network.

According to the structure, an activation instruction is assured to be transmitted to the printer, even when the server is connected to the terminal through only one network.

Here, the first object can also be realized by a printing system in which a printer and a server are connected to a network, wherein the printer includes: a sleep-mode set unit for bringing the printer to a sleep state, by shutting off power against main function units of the printer including a network interface unit; and a machine information transfer unit for transferring, to the server, machine information of the printer which is most recent when being brought to the sleep state, and the server includes a substitute-processing unit for, when a terminal on the network has requested service to the printer to inform of a machine state of the printer, performing the service on behalf of the printer in the sleep state using the transferred machine information.

According to the structure, even when the printer is in a sleep state, the server can respond to connection inquiries and the like, which enables updating of the machine information while the printer is disconnected from the network.

Here, the substitute-processing unit may set the printer IP address to an IP address of the server, receives a request directed to the printer from the terminal, and may respond to the request on behalf of the printer.

According to the structure, the server can certainly substitute for the printer.

Here, the substitute-processing unit, when receiving a notification that the printer has been released from the sleep state, may transfer the machine information, back to the printer, which is used while performing the service on behalf of the printer.

According to the structure, in case when the machine information is rewritten by the server while the printer is in the sleep state, the printer can obtain the rewritten information, which enables to maintain data consistency.

Here, the second object of the present invention is achieved by a printer connected at least to a first network and a second network, including: a print control unit connected to the first network, which controls printing operation of the printer, when receiving a printing instruction through the first network; and a power management unit connected to the second network, which is supplied power when an activation instruction is received through the second network, which then starts activating the print control unit.

According to the structure, enhanced power saving is achieved, since the power management unit is also shut off from power, until the printer gets an activation request.

The third object of the present invention is achieved by a server used in a printing system in which a printer is connected at least to a first network and a second network, the server including: a detect unit for detecting whether the printer is in a sleep state; and a substitute-processing unit for performing service, when the detect unit has detected that the printer is in the sleep state, to a terminal on the first network on behalf of the printer.

According to the structure, when the terminal makes a connection inquiry, the printer will be recognized by the terminal, since the server substitutes for the printer.

Here, the server may further include: a router which is connected to the first and second networks and which routes, to the second network, an activation instruction directed to the printer over the first network from the terminal.

According to the structure, even when the printer is connected to the terminal through only one out of the two networks, and when the printer can only receive an activation request from the other network, the activation request will be assured to be transferred to the printer.

Here, the fourth object of the present invention is achieved by a substitute-processing method which makes a server perform service on behalf of a printer, the server being used in a printing system in which the printer is connected at least to a first network and a second network, the substitute-processing method including: a detecting step for detecting whether the printer is in a sleep state; and a substitute-processing step for performing service on behalf of the printer to a terminal on the first network, when having detected that the printer is in the sleep state.

According to the method of making the server substitute for the printer while the printer is in the sleep state, the server enables to respond to an inquiry which is directed to the printer from the other terminal, on the connection and the like. This enables to update machine information and the like, even while the printer is cut out from the network.

Here, the fifth object of the present invention is achieved by a program for making a server operate in a printing system in which a printer is connected to at least to a first network and a second network, the program making the server perform: a detecting step for detecting whether the printer is in a sleep state; and a substitute-processing step for performing service, when the printer has been detected to be in the sleep state, on behalf of the printer to a terminal on the first network.

According to the program installed in the server, the method of making the server substitute for the printer will be executed.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 4 is a diagram showing the structure of a frame;

FIG. 18A is a diagram showing the content of the address management table before the impersonating transaction, and FIG. 18B is the content during the impersonating transaction.

DESCRIPTION OF THE PREFERRED EMBODIMENTS (Entire Structure)

Figure 1:
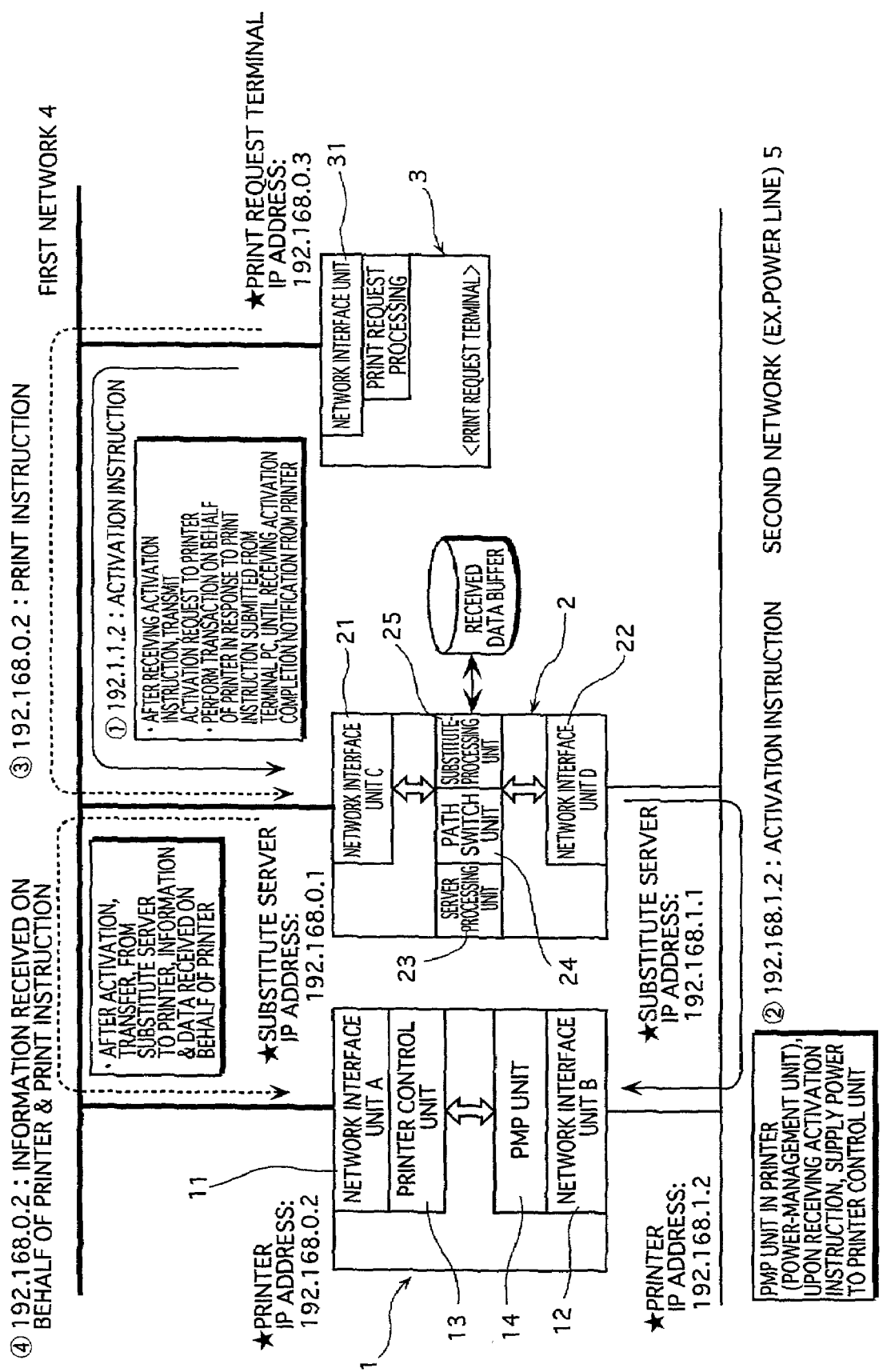
FIG. 1 is a system diagram showing the entire structure of a network according to the first embodiment of the present invention.

FIG. 1 shows one application example of a printing system according to the present invention. In FIG. 1, 1 depicts a printer, 2 depicts a substitute server, and 3 depicts a print request terminal. The printer 1 also functions as a printer server, which can directly receive a print request from the print request terminal when the print 1 is in a ready state, not in a power-saving state. The terminal 3 shown in FIG. 1 is only one terminal, although, in reality, a plurality of terminals are connected to each other. The substitute server 2 is different from a printer server usually used in an ordinary printing system. The substitute server 2 performs such functions as substituting for the printer server, and acting as a router for routing a packet from one network to the other network.

The printer 1 comprises a pair of network interface 11, and 12. Likewise, the substitute server 2 comprises a pair of network interface 21 and 22. The print request terminal 3 comprises one network interface 31. All three apparatuses: the printer 1; the substitute server 2; and the terminal 3, are connected to a first network 4 through the mentioned network interfaces 11, 21, and 31. The substitute server 2 and the printer 1 are connected to a second network 5 through the other network interfaces 12 and 22.

The first network 4 is a bus-type network for example, and uses a twisted pair cable of the 10BASE-T for connecting each apparatus. The second network 5 uses a power line. Driving power is supplied, through the power line 5, to the apparatuses 1 and 2. Both of the network 4 and the network 5 are a connectionless-type open network which uses, as its standard protocol, TCP/IP(Transmission Control Protocol/Internet Protocol).

The network interfaces 12 and 22, that are connected to the network 5 which also functions as a power line, are mainly composed of a filter for extracting a signal component superimposed on commercial frequency and a decoding circuit for decoding an extracted signal. On the other hand, a LAN card is used for the network interfaces 11 and 21 that are connected to the first network 4.

The printer 1, the substitute server 2, the terminal 3 each own an IP address for each of the network 4, and 5. For example, the printer 1 owns "192.168.0.2" as an IP address on the first network 4, and owns "192.168.1.2" as an IP address on the second network 5. Likewise, the substitute server 2, on the first network 4, owns "192.168.0.1", and owns "192.168.1.1" on the second network 5, as an IP address respectively.

(Structure of Printer)

Figure 3:
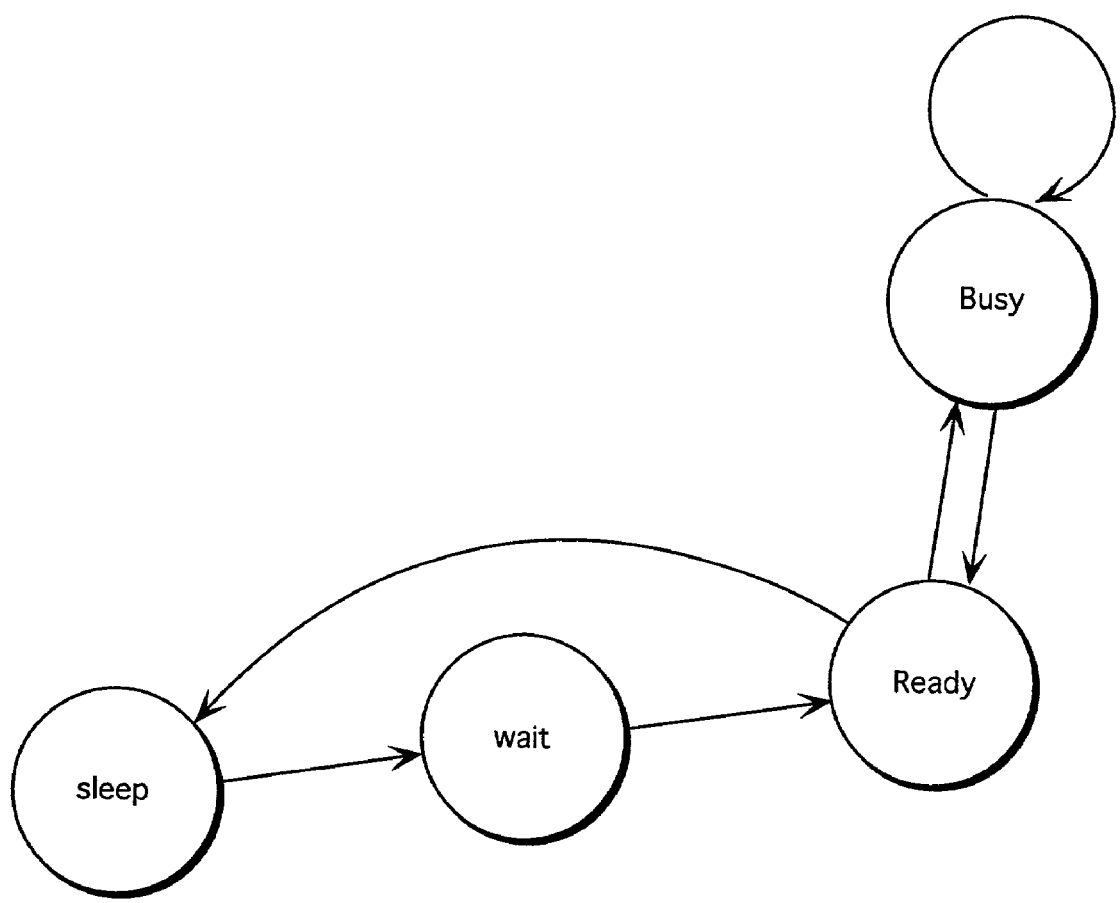
FIG. 3 is a diagram showing a state transition of the printer.

Inside the printer 1, inputted information from the first network 4 and through the network interface 11 is transmitted to a printer control unit 13. On the other hand, inputted information from the second network 5 through the network interface 12 is transmitted to a PMP unit 14. Included inside the printer 1 other than the above, not shown in figures, is a main printer body for executing printing. A representative example of the main body of the printer is an electrostatic-type printer. That is, this printer is equipped with photosensitive drum around which the following are provided: a sensitizing charger; a semiconductor laser exposure unit; a developer unit; a transferring unit; a cleaning unit; and a fixing unit for heat-fixing a toner image after transferred. The printer 1 further includes a processing circuit for converting document data received through the network into printing data, and a processing circuit which performs a variety of amendment such as edge emphasis on printing data. Also included in the printer 1 is image memory for temporarily storing printing data. The printer 1, as shown in FIG. 3, performs a state transition to save power if it does not receive a print request for a predetermined time period from any terminal. The state transition shown in FIG. 3 will be described after the description of the PMP unit 14.

The printer control unit 13 mainly functions as a printer server. Specifically, the printer control unit 13 performs its function by controlling each unit of the printer in order to perform printing in response to a print request frame received through the network 4. The printer control unit 13 consists of hardware such as a CPU and memory, and application software.

Figure 7:
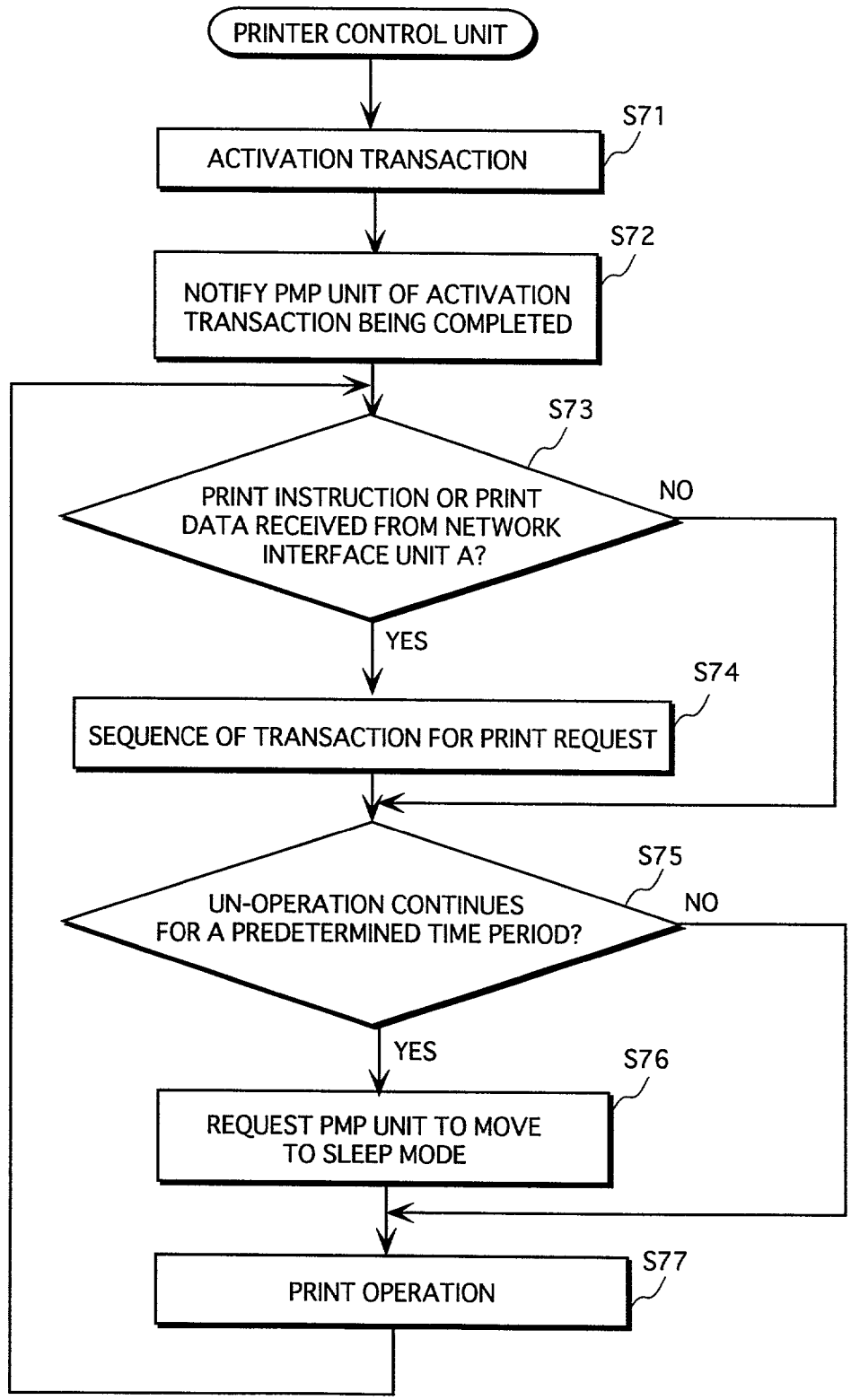
FIG. 7 is a flow chart showing the operation performed by the printer control unit.

FIG. 7 shows a flow chart for the printer control unit 13. When activated by the PMP unit 14, the printer control unit 13 performs activation processing such as initialization of RAM (S71). When the activation procedure has been complete, the printer control unit 13 notifies the PMP unit 14 of the completion of the activation procedure (S72). Hereafter, each time either a print-instruction-reception-notification or a print-data-reception-notification is received from the network interface unit 11(S73), the printer control unit 13 performs an ordinary print reception sequence (S74), and performs printing processing for the received data (S77).

On the other hand, the printer control unit 13 always keeps a watch on the state of a printer, and when an in operation state continues for a predetermined time period without receiving any signal input through the network (S75), the printer control unit 13 orders the PMP unit 14 to bring the printer to a sleep state (S76).

Figure 2:
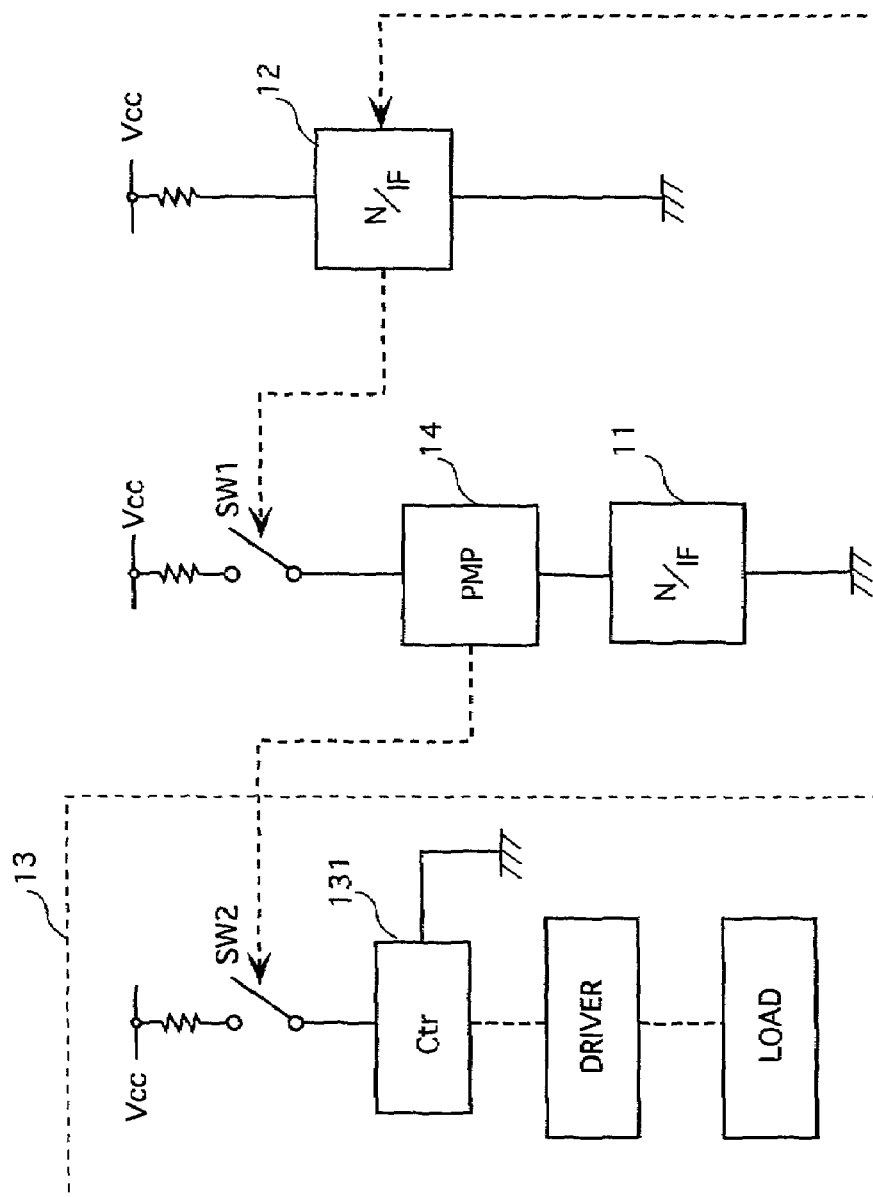
FIG. 2 is a diagram showing a PMP circuit in the printer.

The PMP unit 14 administers power for the entire printer 1. The PMP unit 14 is composed of a micro computer of 8 bit for example, and is connected to the network interface unit 12 and to the printer control unit 13 as shown in FIG. 2. When the second network 5 has received a predetermined signal (i.e. an activation signal as mentioned below) while the printer is in a sleep state, the network interface unit 12 extracts the signal component, and decodes it into a switch-throwing control signal, and throws a power switch SW1 to the PMP unit 14. The power switch SW1, for example, consists of a switching circuit including a transistor. Once the power switch SW1 has been thrown, the PMP unit 14 will be activated, and power will be supplied to each controller 131 in the printer control unit 13.

Figure 8:
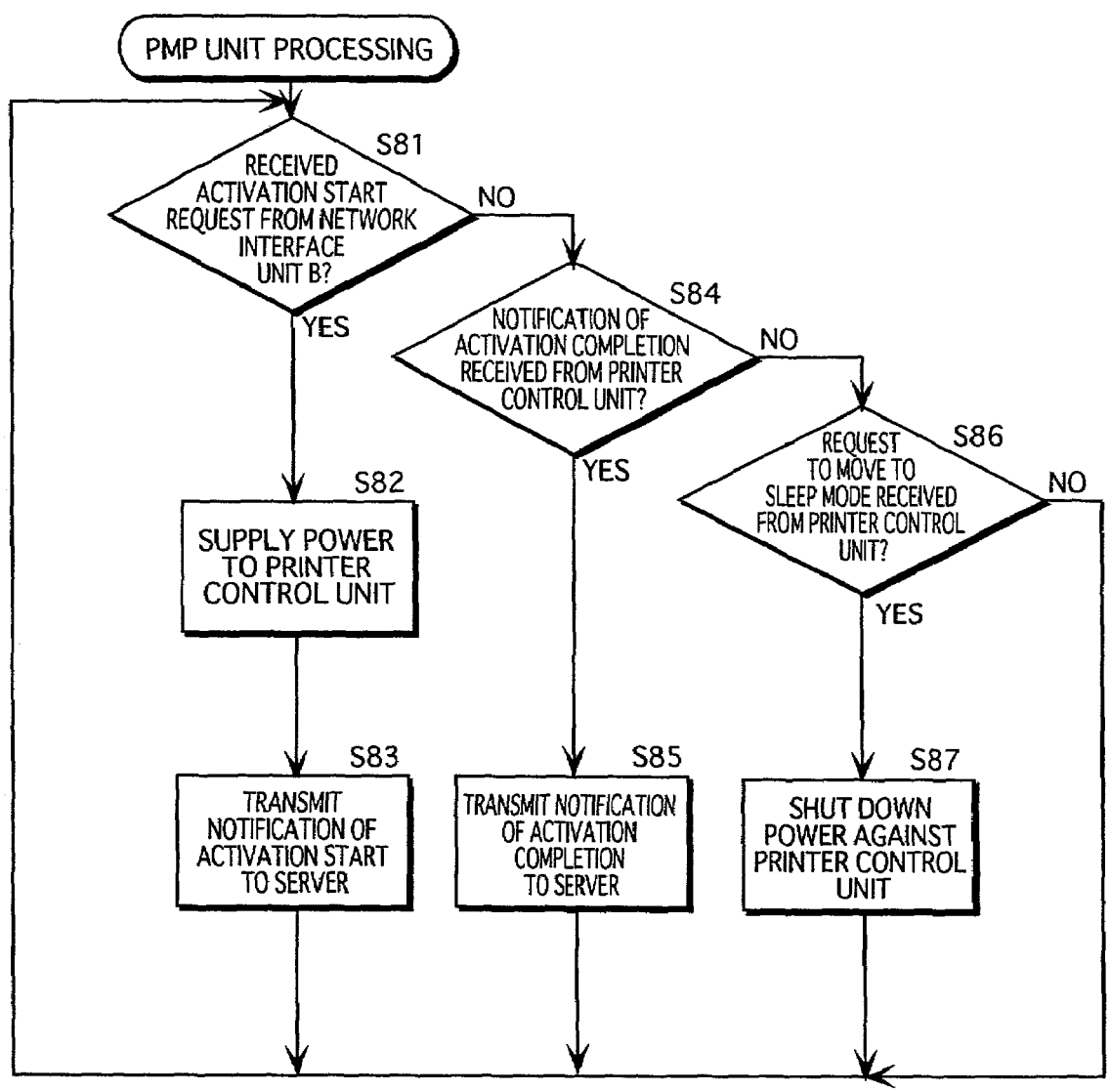
FIG. 8 is a flow chart showing the processing performed in the PMP circuit.

FIG. 8 is a flow chart showing a management operation performed by the PMP unit 14. Receiving an activation starting request from the network interface unit 12 (S81), the PMP unit 14 supplies power to the printer control unit 13 (S82), and notifies the substitute server 2 of the activation start (S83). Upon receiving a notification, from the printer control unit 13, of the completion of the activation procedure (S84), the PMP unit 14 notifies the substitute server 2 of the completion of the activation procedure (S85). Further, when the printer control unit 13 has requested that the printer should be brought to the sleep state (S86), the PMP unit 14 shuts down power from the printer control unit 13 (S87). Then, the PMP unit 14 shuts down its own power.

When power is supplied to the printer control unit 13, the printer 1 will be brought from the sleep state shown in FIG. 3, to the ready state through the wait state. The sleep state shown in FIG. 3 is a state in which both switches SW1 and SW2, and the PMP unit 14 are all off. At this moment, the network interface 11 connected to the first network 4 should be off too. Therefore, in the sleep state, the printer 1 is shut against the first network, and only can be activated through the second network 5. The wait state is in a transition state from the sleep state to the ready state. Specifically, the wait state is a state in which it is impossible to receive print data, but in which the SW1 in FIG. 2 has been thrown and power has been supplied to the PMP unit 14. The ready state is in a state in which normal reception of print data is made possible, but it may be impossible to perform actual printing. Hereinafter, a state in which print data is being stored on the memory is also referred to as a ready state. A busy state is a state in which printing is being performed.

Another sleep state is also possible in which power is shut down from the network interface 12, but in which it is possible to bypass an activation instruction signal to SW1 directly from the second network 5. This enables to turn SW1 on, while simultaneously activating both of the PMP and the network interface 12. Structured as above, the power consumption by the printer will be controlled to be zero in substance in the sleep state. Rewriting processing of the IP address performed in the printer (which will be detailed later) will be performed after completion of activation for the network interface 12.

(Structure of Terminal)

The print request terminal 3 consists of a personal computer for example, and is equipped with application software in which document creation and communication function and the like are unified. The print request terminal 3 generates a print request frame in which the main message is made up of documents created by the application software, and transmits the frame to the first network 4 through the network interface unit 31. An example of the print request frame is shown in FIG. 4. This frame has a frame structure of the CSMA/CD method, in which PA is a preamble used for establishing synchronization, SFD is a frame starting delimiter, and FCS is a frame check sequence (CRC). Source and destination addresses both use a MAC (Media Access Control) address. The MAC address is for identifying a specific apparatus on the LAN under a sub-layer of the data link layer in the OSI basics reference model. The MAC address normally is made up of 48 bits, and is different from the IP address which is usually made up of 32 bits.

The print request terminal 3 includes an address management table inside. This address management table manages IP address and MAC address for all the apparatus existing on the network, including the printer 1 and the substitute server 2. In the address management table, the IP and MAC addresses, in activation, are stored in a different manner from those in data transmission. This is because the activation is performed, as mentioned above, through the second network 5. This is why target addresses stored in the activation request frame are different from those stored in the print data transmission frame.

(Structure of Substitute Server)

The substitute server 2 functions as a router and also substitutes for the printer 1. In performing its router function, when the destination address stored in a frame transmitted from the print request terminal 3 does not exist on the first network 4, the substitute server 2 transfers the transmitted frame to the network on which the destination address exists.

When substituting for the printer 1, the substitute server 2 performs as if it were the printer 1 on a certain condition. This embodiment adopts a method of rewriting the IP address in the address management table which the print request terminal 3 refers when transmitting frames. Once the IP address has been rewritten, the print request terminal 3 is able to send a frame addressed to the printer 1. However the destination address has been rewritten to be that of the substitute server 2. Accordingly, the substitute server 2 is to receive the transmitted frame. As seen in the above, the substitute server 2 acts as if it were the printer 1. The state of the substitute server 2 substituting for the printer 1 in the above-mentioned manner is referred to as "impersonating state" in this description.

Figure 5:
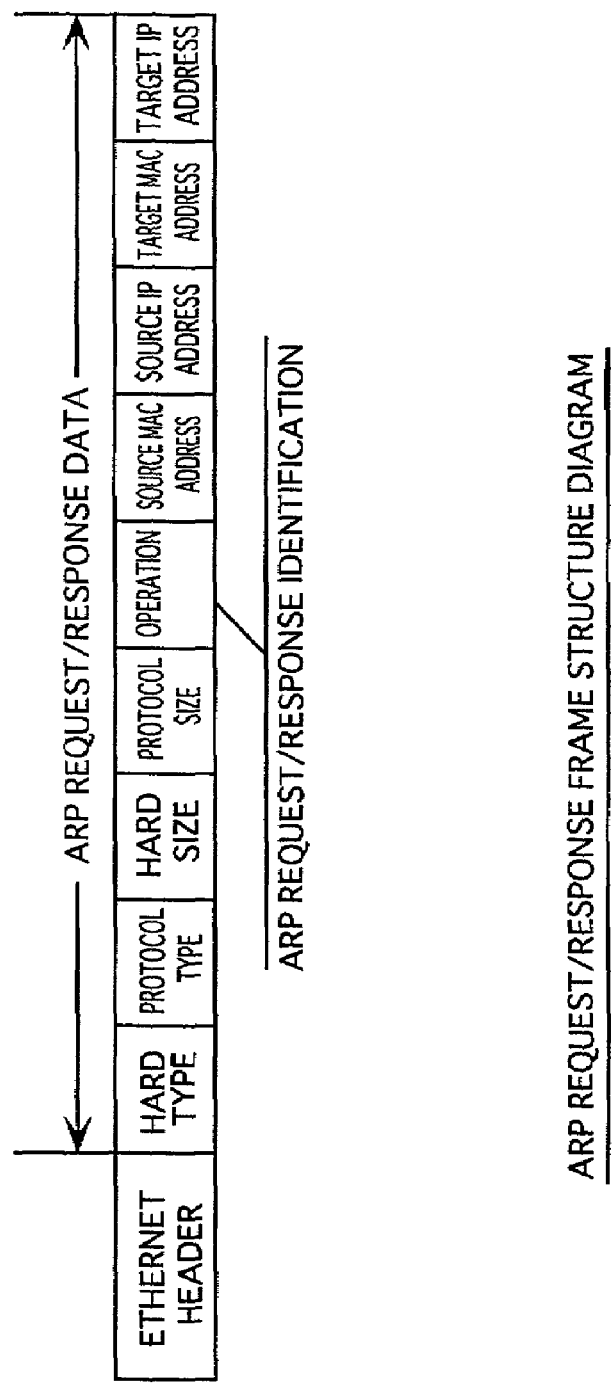
FIG. 5 is a diagram showing the structure of an ARP request/response frame.

Note that the rewriting of the table in the print request terminal 3 is performed according to the ARP(Address Resolution Protocol) request/response processing. FIG. 5 is a diagram showing a frame used for the ARP request/response processing. When the target IP address in FIG. 5 is rewritten to be the address of the substitute server and the rewritten address is transmitted to the network, the print request terminal 3 will receive the frame and rewrite the IP address in its own table.

In realizing the above function, the substitute server 2 includes a printer monitor unit 23, a path switch unit 24, and a substitute-processing unit 25, in addition to the network interface 21, 22. The print monitor unit 23 monitors the state that the printer is currently in. The path switch unit 24 functions as a router. The substitute-processing unit 25 acts as the printer 1. The substitute-processing unit 25 includes memory which stores frames transmitted (mostly print data), during the substitute-processing, from the print request terminal 3. An operation of the substitute server 2 is detailed in the flow charts from FIG. 9-FIG. 14, which will be described after the operation of the entire system is described.

(Operation of the Entire System)

Figure 6:
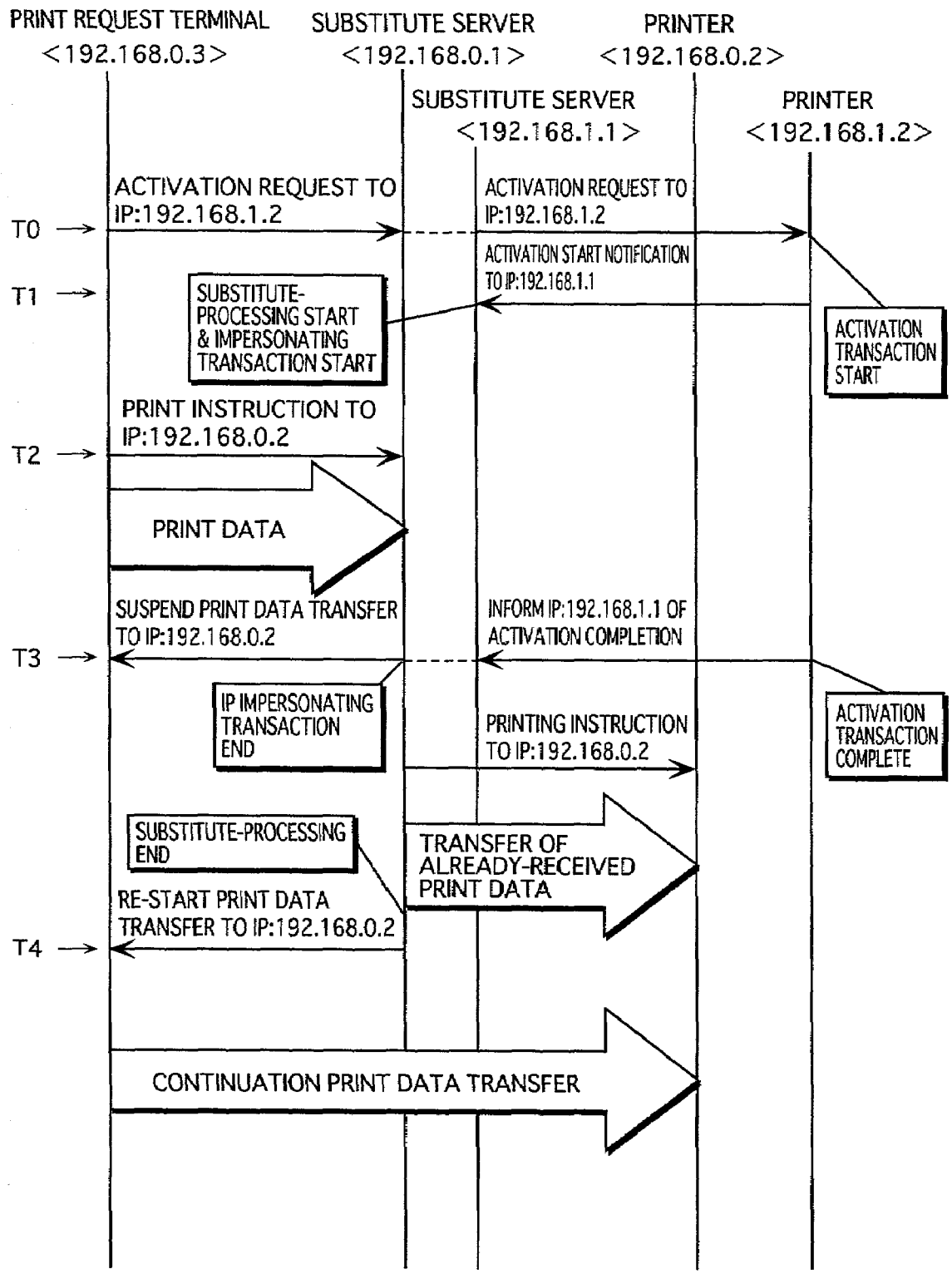
FIG. 6 is a diagram showing a print sequence between a print request terminal, a substitute server, and a printer.

Next, an overview is provided with reference to FIG. 6 for the operation performed by the entire network system. FIG. 6 shows a sequence of processing performed between the printer 1, the substitute server 2, and the print request terminal 3. Here, assumption is made that the printer 1 is in a sleep state in which a print request has not been received for a long period of time. At time T0, an activation request is given by any print request terminal 3. The target IP address of the frame designates one on the second network 5. Here, the substitute server 2 works as a router and performs routing the activation request frame to the printer 1 through the second network 5. The printer 1, upon receiving this request, starts activating and transmits a response frame informing of an activation start to the print request terminal 3 which is the source.

This response frame is also transmitted through the second network 5. This means that the substitute server 2 also performs routing processing as for this response frame. The substitute server 2, from the time T1, starts an impersonating transaction by making the substitute-processing unit 25 to work. At time T2, a print instruction frame and then a print data frame are transmitted from the print request terminal 3 and forwarded to the printer 1. The two frames are factually received by the substitute server 2.

After a predetermined time period from the starting of activation, the printer 1 is released from the sleep state to the ready state with the wait state in-between. Then, a message frame, addressed to the printer, for informing the completion of activation is transmitted through the second network (at time T3). The substitute server 2 performs routing as for this frame, and terminates the impersonating transaction. The substitute server 2 commands the print request terminal 3 to suspend frame transmission. This suspending process is to facilitate transmitting, to the printer, the print data stored in the memory of the substitute server 2 during the substitute-processing. This enables printing the stored data in advance, or to store the data in the printer memory. Upon completing the stated transmission, the system notifies the print request terminal 3 of a permission to re-start transfer of print data. After this, print data will be transmitted directly to the printer 1 from the print request terminal 3, and printing execution will be continued.

(Operation of the Substitute Server)

The description of the operation performed by the substitute server is described for each of the network interface unit 21, 22, the printer monitor unit 23, the path switch unit 24, and the substitute-processing unit 25.

Figure 9:
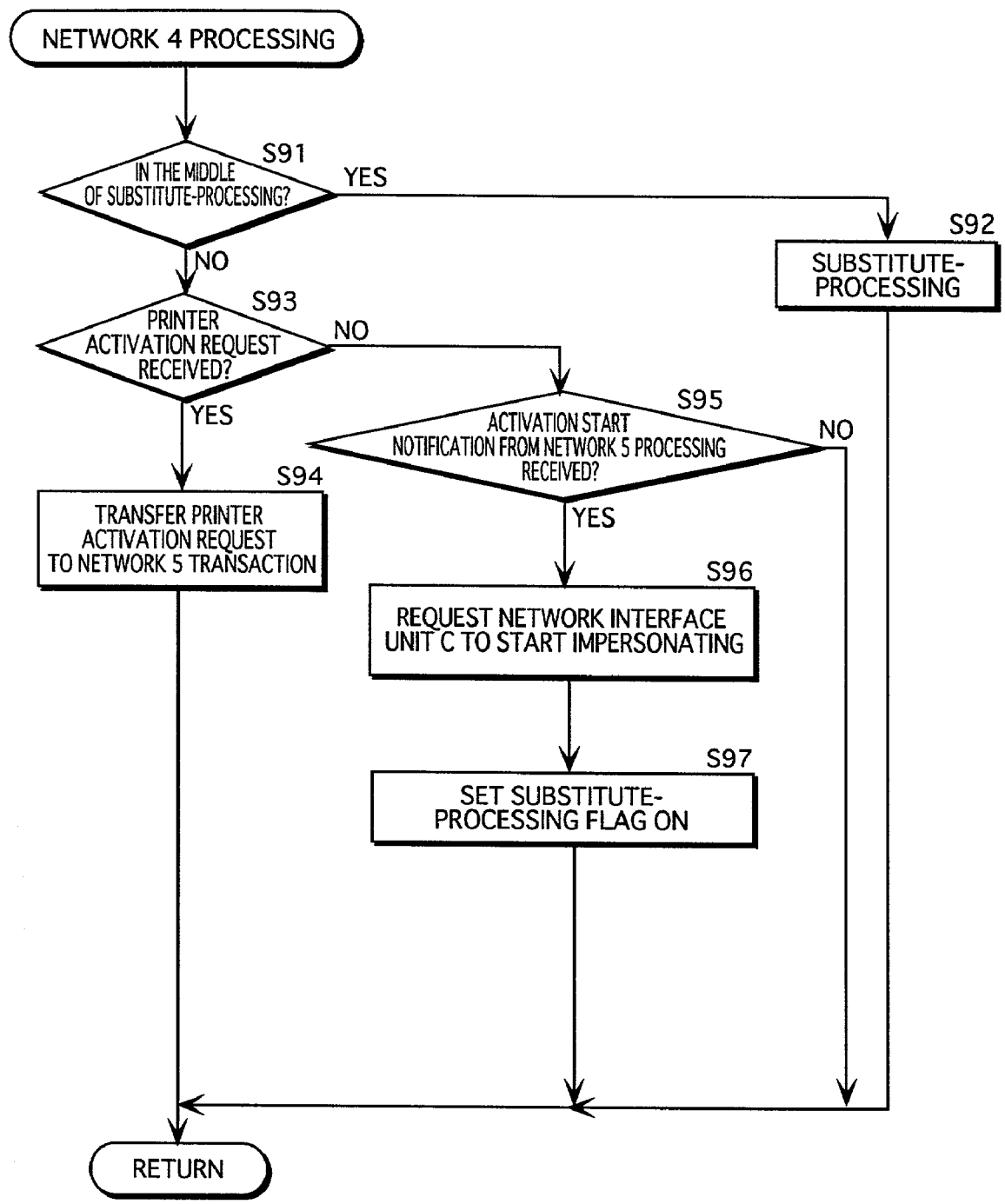
FIG. 9 is a flowchart showing the processing performed on the first network.
Figure 10:
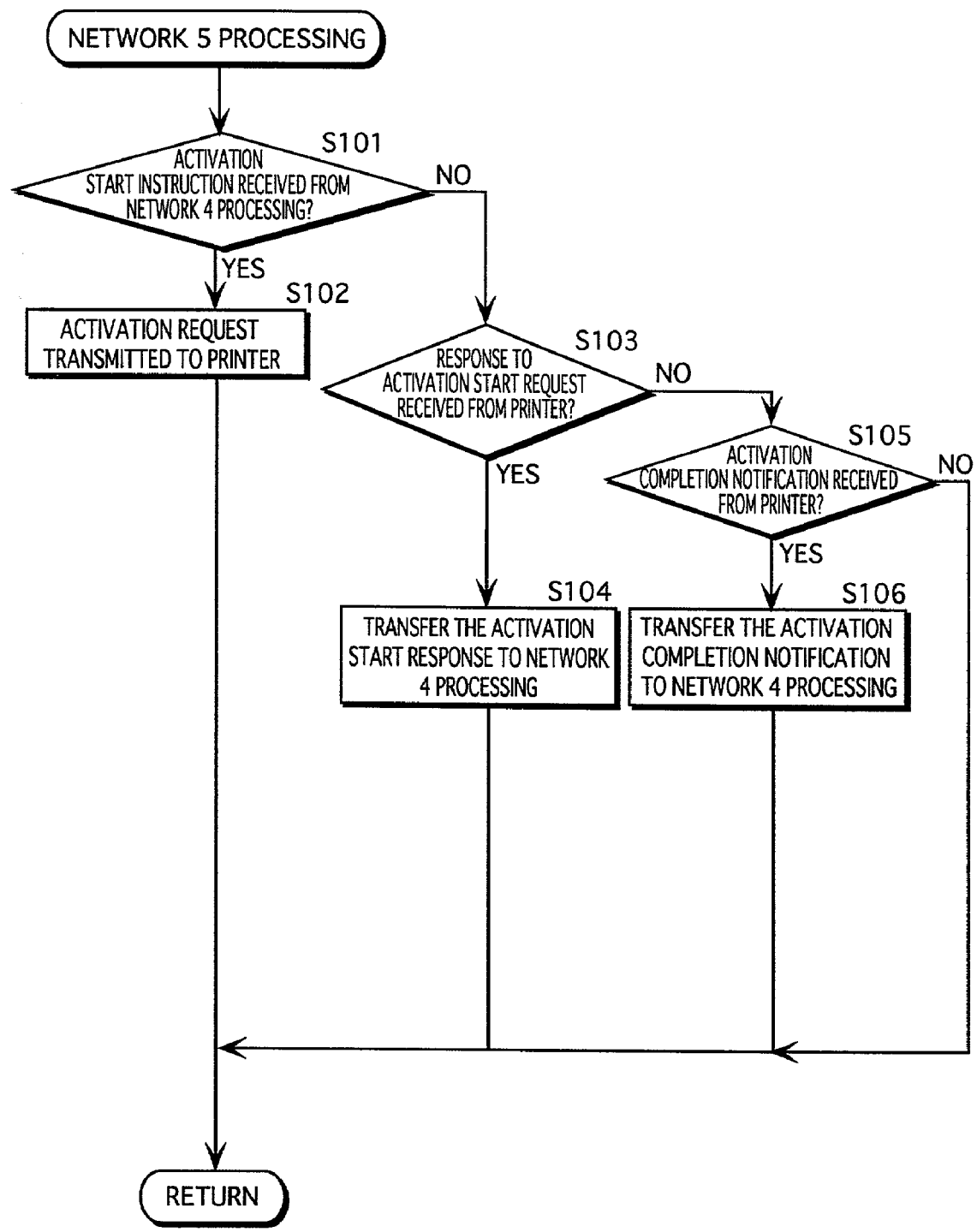
FIG. 10 is a flow chart showing the processing performed on the second network.

FIG. 9 is a flow chart showing processing for the first network 4, which is performed by the substitute-processing unit 25 and the path switch unit 24. FIG. 10 is a flow chart showing processing performed for the second network 5. Both of the mentioned processing are subroutines, and are structured to be performed alternately.

Figure 11:
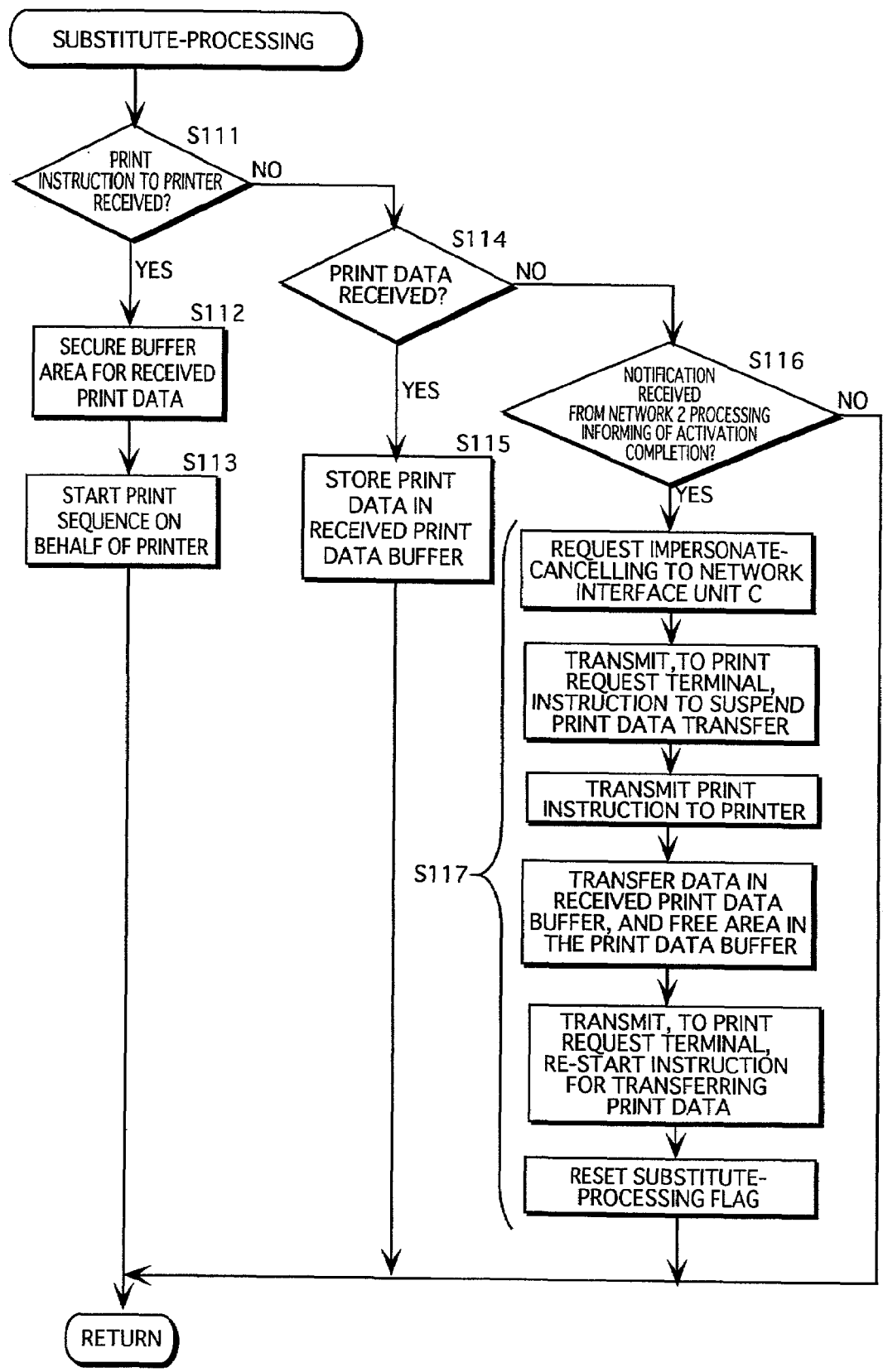
FIG. 11 is a flowchart showing the substitute-processing performed by the substitute server.

First, for the first network 4, judgment is performed to see whether it is during substituting for the printer(S91) The judgment is performed according to the state of a substitute-processing flag. In the initial stage, the substitute-processing flag has been reset. If it is judged to be during substituting for the printer, a call is made to a subroutine for the substitute-processing (S92). This subroutine is shown in FIG. 11, which will be described after the description of FIG. 10. Suppose, when judged not to be during substituting for the printer, that a notification is received from the network interface 21 that the stored frame storing an IP address which belongs to a different network. Then, if the received frame has turned out to contain an activation request for the printer (S93), the control is moved to perform a routing for transferring the activation request to the second network 5 (S94). Upon receiving a response to the activation start from the second network routine (FIG. 10), a request is issued for starting substitute-processing(S96), and the substitute-processing flag is set to be on(S97).

For the second network, upon receiving an instruction to start activating(S101) (from the processing routine for the first network depicted in FIG. 9), the activation request for the printer is transmitted (S102). On the other hand, upon receiving, from the printer, a response to the request to start activating (S103), the activation start response is transferred to the processing routine for first network (S104). Further, if it is a notification of completion of activation from the printer (S105), the notification is transferred to the processing routine for the first network (S106).

FIG. 11 shows the substitute-processing at Step S92. When the received frame is a printing instruction to the printer (S111), memory area for the received print data buffer is secured (S112), then the substitute-processing transaction starts (S113). Hereinafter, every time print data is transmitted (S114), the print data will be stored in the area in the data buffer (S115). On the other hand, upon receiving a notification of completion of activation from the second network processing routine (S116), the network interface unit 21 will be requested to cancel the substitute-processing transaction, and requests the print request terminal 3 to suspend transmission of print data. Further, the printing request is issued to the printer, and the print data that has been stored in the data buffer is sent to the printer. Then, the request to re-start transferring print data is made to the print request terminal, and the substitute-processing flag is reset (S117).

Figure 12:
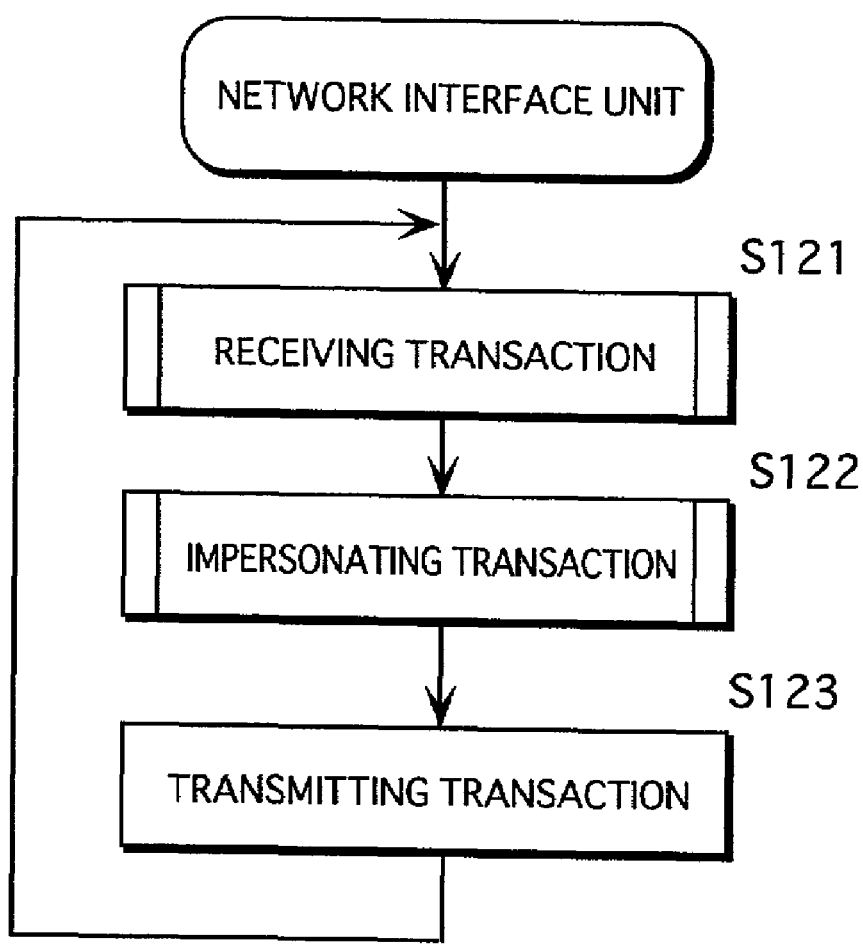
FIG. 12 is a flow chart showing the transaction performed by a network interface unit.
Figure 13:
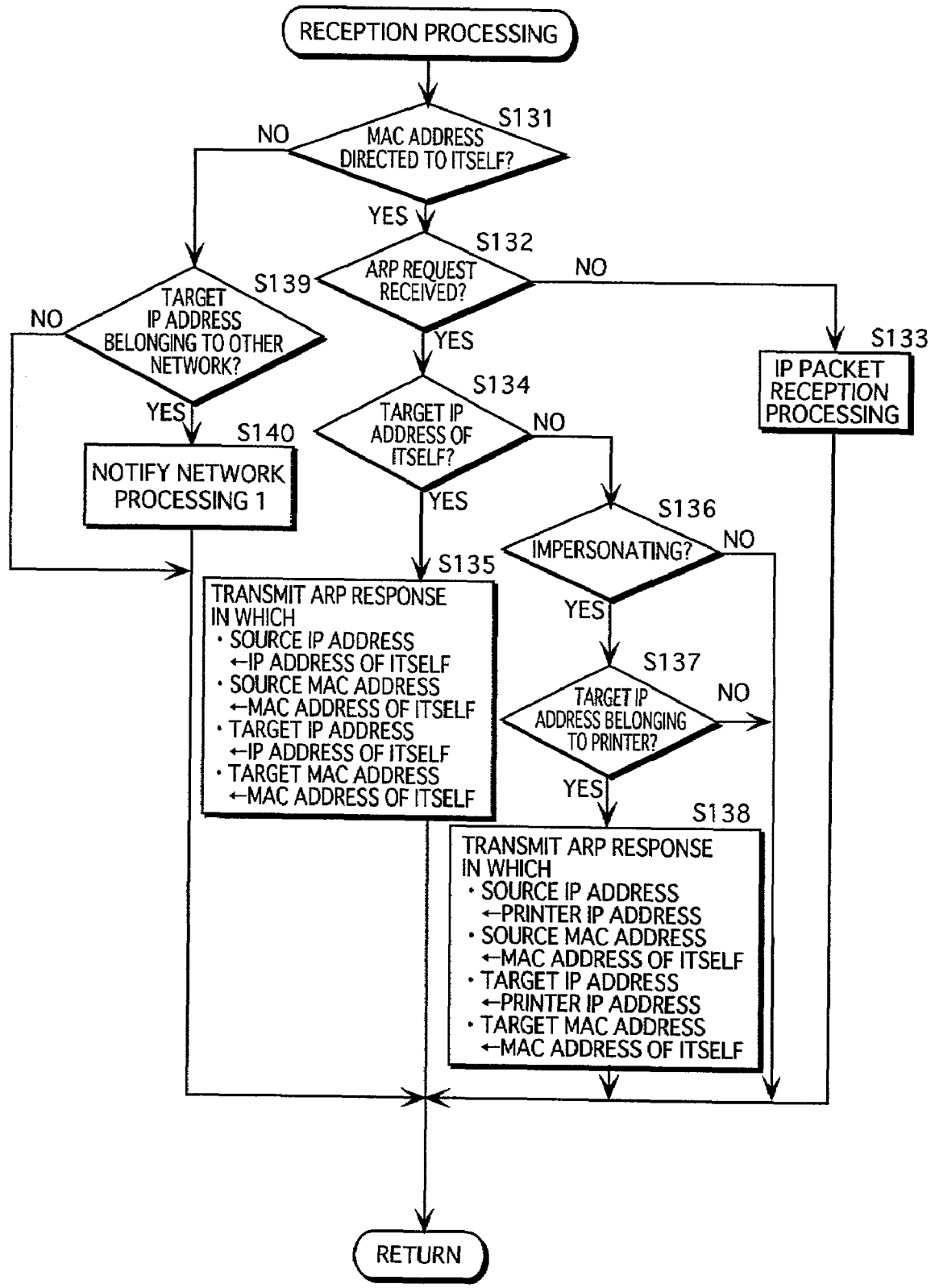
FIG. 13 is a flow chart showing the reception processing performed by the substitute server.

Next, the transaction performed by the network interface unit 21, 22 is described. As FIG. 12 shows, the network interface unit 21, 22 performs "receiving transaction (S121)," "impersonating transaction(S122)," and "transmitting transaction (S123)." The receiving transaction is a subroutine which is shown in FIG. 13. This subroutine is called every time a frame is received through the network. Then, judgment is performed as to whether the target MAC address in the received frame corresponds to its own MAC address (S131), and whether it is an ARP request (S132). If, at S131, the MAC address is judged not to be its own address, another judgment is performed as to whether it is an IP address for a different network (S139), if it is an address for a different network, notifies the first network processing routine since in order to perform routing (S140). This notification will be detected at Step S93 in the first network processing routine and the routing will be performed.

On the other hand, if the received frame includes its own MAC address, and it is not an ARP request frame, ordinary IP packet reception processing is performed (S133).

If the received frame is an ARP request frame (see FIG. 5), and the address stored in the target IP address is its own IP address (S134), the MAC address of its own is set to be the target MAC address in order to generate an ARP response frame as usual, and the target MAC address is transmitted to the network (S135). If the target IP address is not its own IP address, processing differs depending on whether it is in the impersonating state. Suppose the substitute server is in the impersonating state (S136). In this case, if the target IP address includes the IP address of the printer (S137), an ARP response frame is created and transmitted in which only the MAC address of its own is set to the target MAC address, keeping the target IP address as the IP address of the printer (S138). Once the ARP response frame in which the target MAC address is set to be its own MAC address, thenceforth every frame which is addressed to the printer will be received by the substitute server, and control will be transferred to the IP packet receiving processing at Step S133.

If not during the impersonating state (S136), or if the target IP address is not that of the printer even in the impersonating state (S137), the received frame will be transmitted to the network as it is without processing it.

The judgment to see if it is during the impersonating state or not in S136 will be done by an impersonating state flag. The impersonating state flag will be set/reset in an impersonating request processing routine described in the following.

Figure 14:
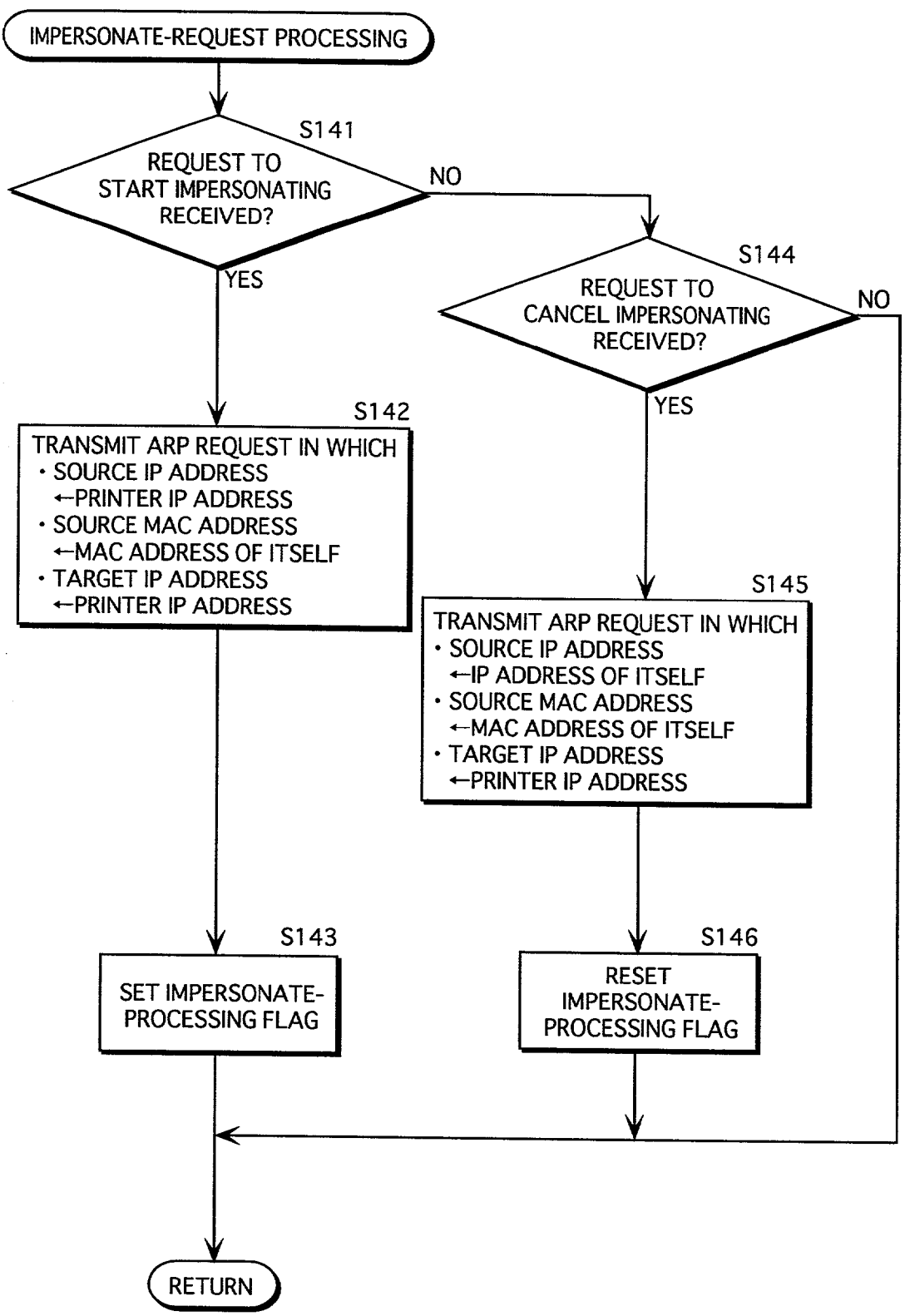
FIG. 14 is a flow chart showing an impersonating request processing.

FIG. 14 shows the impersonating request processing routine. If, in the first network processing routine, a notification of an impersonating start request is sent (S96), the notification is recognized in this subroutine (S141). Then, the source IP address and the target IP address are set to be the corresponding IP addresses for the printer, and an ARP request frame in which the source MAC address is set to be its own MAC address, and the ARP request frame is transmitted by broadcast to the network (S142). By this operation, rewriting is performed for the address management table in which the IP address and the MAC address are stored in correspondence (The table is also called as "ARP table"). As a result, every frame whose target IP address is the printer will reach the substitute server 2. Then the impersonating state flag will be set to be on (S143).

When a notification of request is received for cancel impersonating in the substitute-processing subroutine in FIG. 11 (S117), the request will be detected at Step S144. Then, the source IP address will be rewritten to be its own IP address, and the target IP address will be rewritten to be the printer IP address, and an ARP request frame is crated in which the source MAC address an its own MAC address are stored in correspondence, and the ARP request frame is transmitted to the network by broadcast (S145). As a result, the corresponding original addresses have been rewritten on the IP address and MAC address that each terminal has, and frames addressed to the printer will reach the printer. Lastly, the impersonating state flag will be reset (S146).

SECOND EMBODIMENT

In the first embodiment, when an activation request is received from the print request terminal in the sleep state, the substitute server performs routing the request to the other network, and at the same time receives print data transmitted from the print request terminal. The first embodiment relates to the transition from the sleep state to the ready state. The second embodiment, on the contrary, deals with the transition from the ready state to the sleep state, and also with the sleep state before receiving an activation request.

A terminal connected to a network regularly monitors the connection. When the printer is in the power-saving mode (i.e. power-off mode), the printer will not respond to a connection inquiry from the terminal. This means that the printer is disconnected from the network and will not be recognized on the network.

The purpose of the second embodiment is to solve the stated problem. In the second embodiment, the printer continues to be in the power-off mode, which will not respond to any inquiry from other terminals on its own. However, the printer is structured to respond to a certain type of inquiry such as a connection inquiry from other terminals, which satisfies both the power saving request and the operability.

Figure 15:
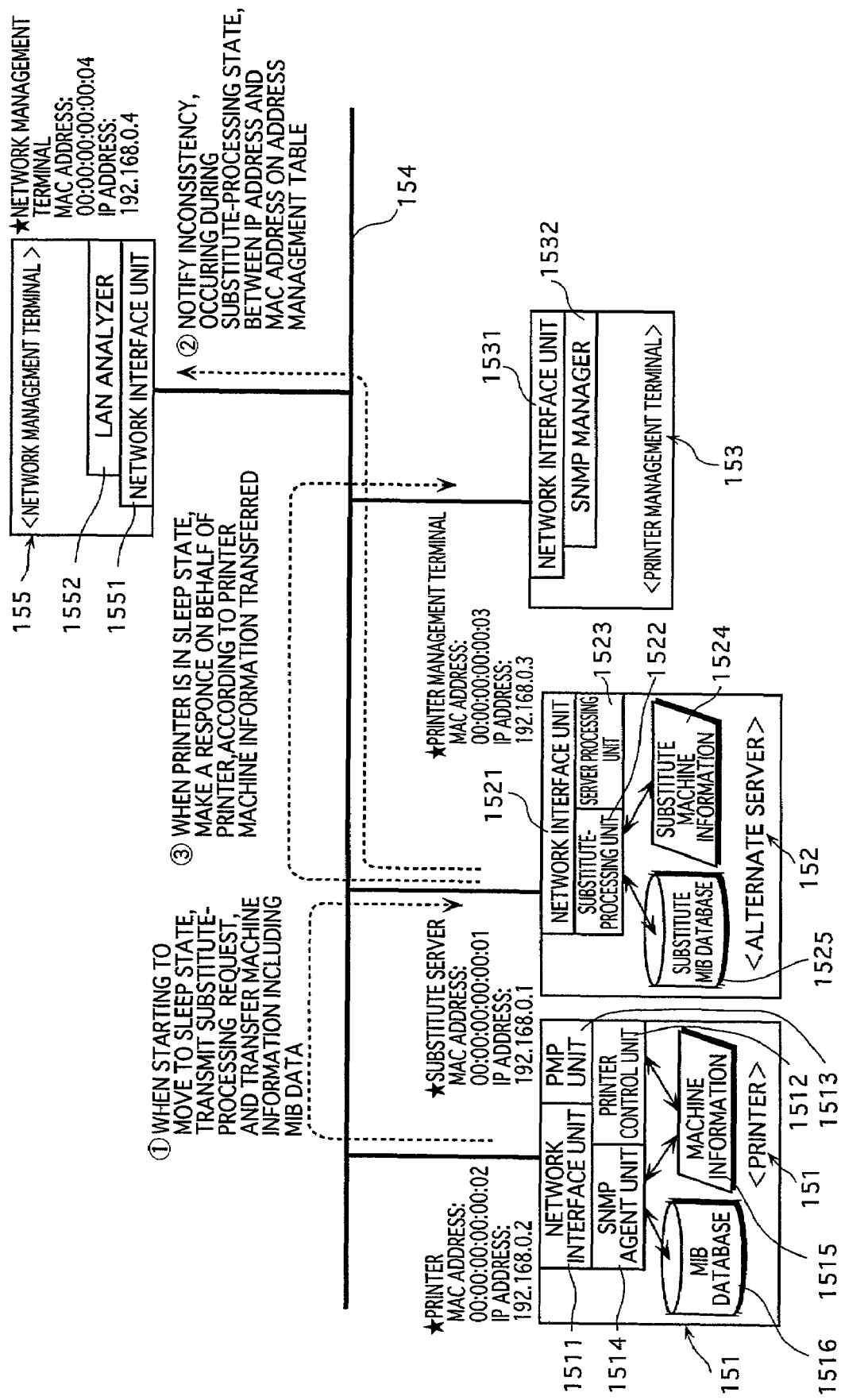
FIG. 15 is a block diagram showing the entire structure of the network according to the second embodiment.

FIG. 15 is a block diagram showing a structure of the entire system of the second embodiment. FIG. 15 is basically the same as FIG. 1 in that a printer 151 and a substitute server 152 exist on the network. The difference is that a printer management terminal 153 and a network management terminal 155 exist on the network. The printer management terminal 153 is to control the printer 151 by making a regular inquiry about the connection to the printer. The network management terminal 155 monitors the status of the network, using a network control tool such as SNMP (Simple Network Management Protocol). This protocol is a standard protocol used to control the apparatuses connected to the TCP/IP network through the network. SNMP comprises apparatuses to be controlled (i.e. a printer, a substitute server, a print request terminal: collectively referred to as "agent") and a workstation (i.e. manager) to control the agent. The manager accesses the agent, to know the status of the agent, and changes the definition of configuration information.

Both of an IP address and a MAC address are assigned to each of the printer 151, the substitute server 152, the printer management terminal 153, and the network management terminal 155, as seen in FIG. 15. Note that only one network is depicted in FIG. 15. This is because the number of network does not matter in this embodiment. The actual number of network can be two as depicted in FIG. 1, or only one network, as depicted in FIG. 15, will also do.

(Printer)

The printer 151 comprises a network interface unit 1511, a printer control unit 1512, a PMP unit 1513, and a SNMP agent unit 1514. The network interface unit 1511 analyzes data sent from the network in order to extract data addressed to the printer itself. The SNMP agent unit 1514 creates a MIB database 1516 using machine information 1515 and responds to the request from the SNMP manager according to the MIB database.

(Substitute Server)

The substitute server 152 comprises a network interface unit 1521, a substitute-processing unit 1522, and a server processing unit 1523. The substitute-processing unit 1522 replaces its IP address with that of the printer, in order to respond, on behalf of the printer, to the request from the SNMP manager, based on substitute machine information 1524 and a substitute MIB database 1525. The server processing unit 1523 performs other server processing.

(Printer Management Terminal)

The printer management terminal 153 comprises a network interface unit 1531, a SNMP manager 1532. The SNMP manager 1532 controls the printer on the network.

(Network Management Terminal)

The network management terminal 155 comprises a network interface unit 1551 and a LAN analyzer 1552 which monitors the state of the network. This network management terminal 155 monitors to avoid overlap in IP address on the network.

(Operation of Entire System)

Figure 16:
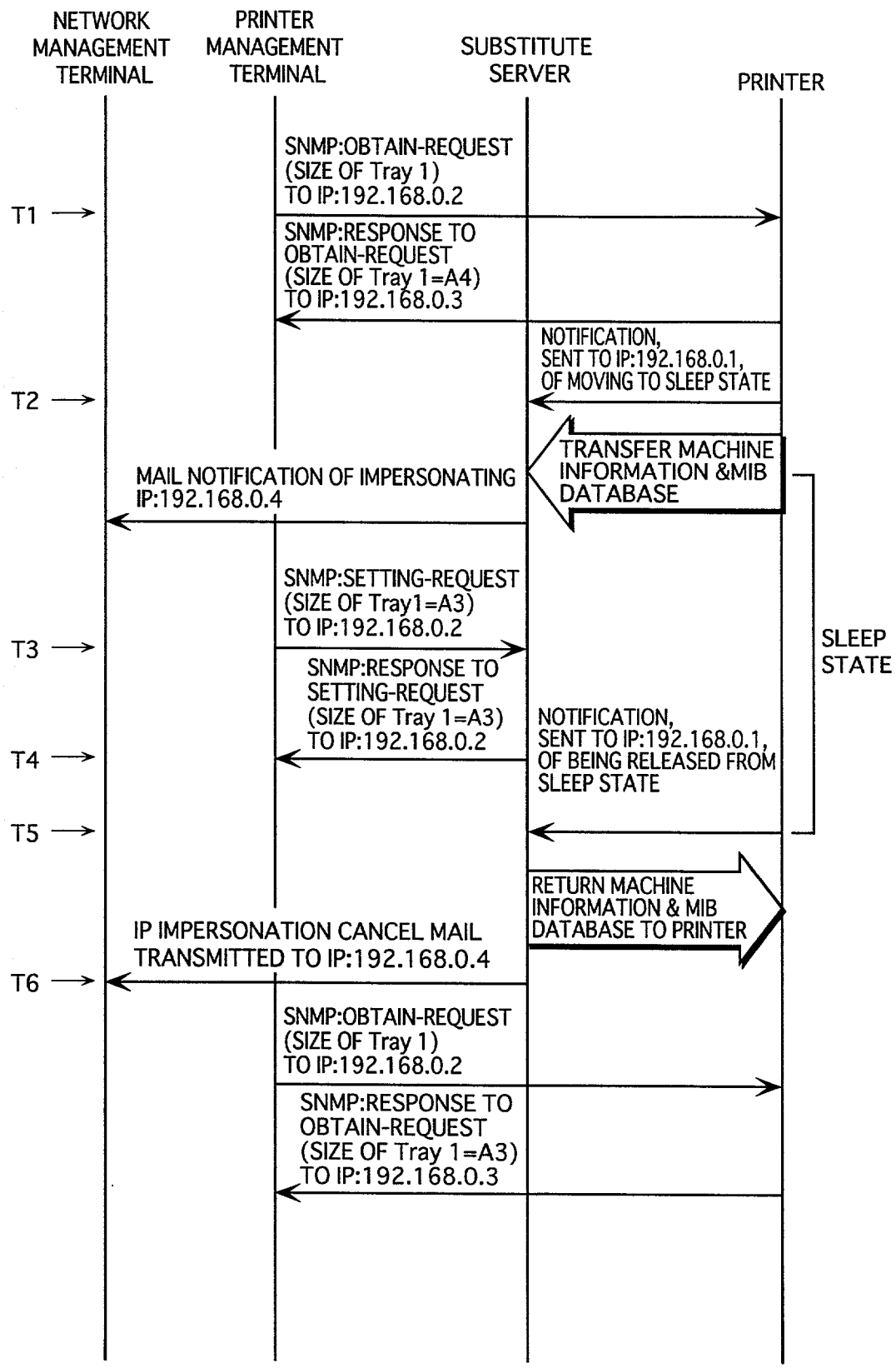
FIG. 16 is a diagram showing the print sequence performed between the printer, the substitute server, the network management terminal, and the printer management terminal.
Figure 17:
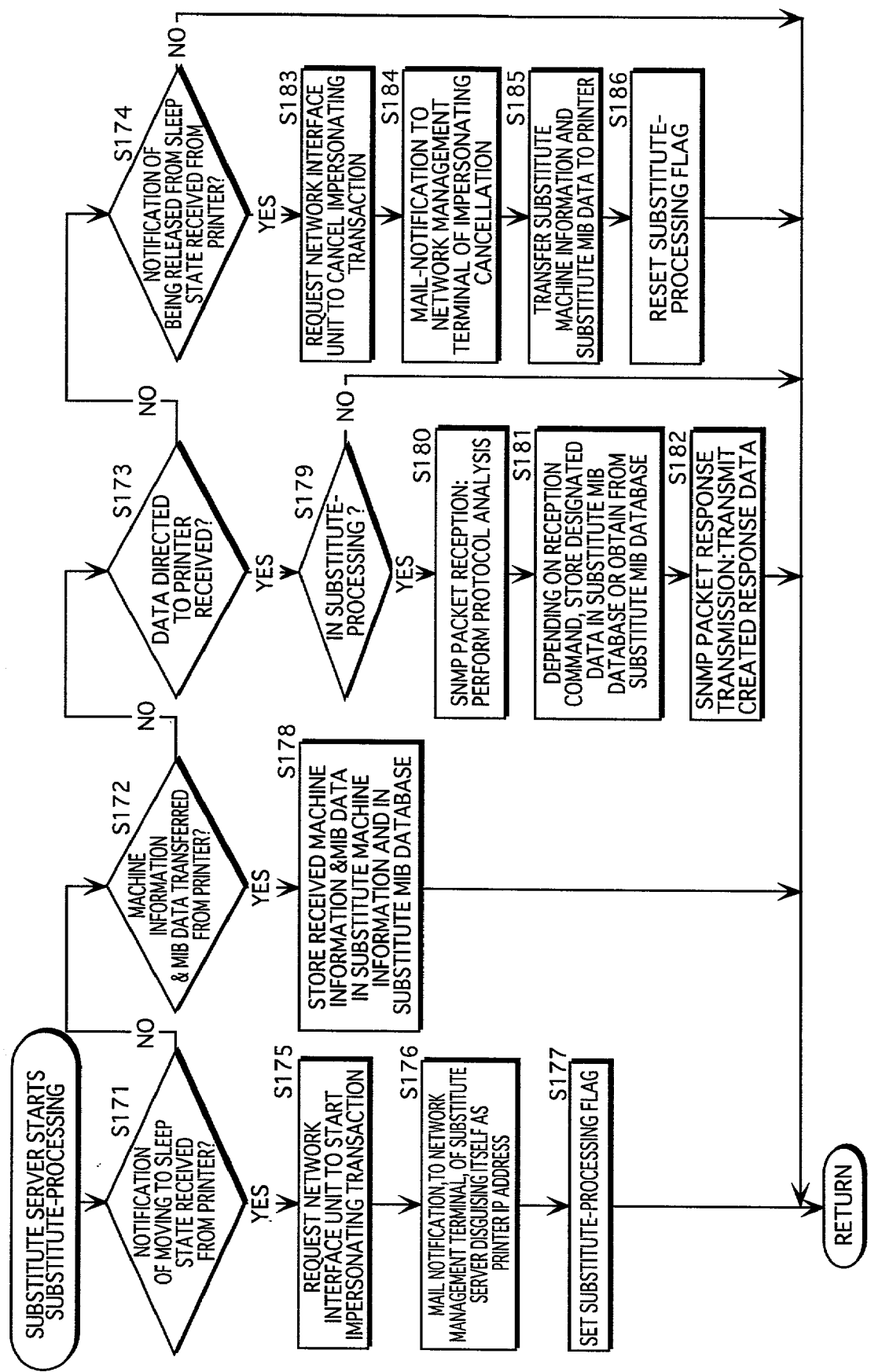
FIG. 17 is a flow chart showing the substitute-processing performed by the substitute server.

FIG. 16 shows a sequence of operation of the entire system. FIG. 17 is a flow chart showing the processing of the substitute server 152. FIG. 18 is a flow chart showing the substitute-processing of the substitute server 152. First, the operation of the entire system is described with reference to FIG. 16. The transaction that the substitute server performs will follow.

In the sequence diagram of FIG. 16, in the first place, the printer 151 is in a ready mode. Therefore, at time T1, the printer 151 responds to an inquiry from the printer management terminal 153. This inquiry is asking about the paper size of the tray 1. The response says that it is A4 size. At time T2, when a predetermined time has passed after the last operation, the printer is brought to a sleep state. At time T2, the printer notifies the substitute server 152 that the printer is in the transition to the sleep state. Then, the substitute server 152 notifies the network management terminal 155 of starting to substitute for the printer, and of replacing the IP address of its own with the printer IP address (which is 192.168.0.2). The network management terminal 155, upon receiving this notification, registers the addresses in the internal address management table. FIGS. 18A and 18B depict the address management table. FIG. 18A is the address management table before receiving the notification, and FIG. 18B is the table after taking into account the notification. The second line in FIG. 18B is newly registered, in which the MAC address is that of the substitute server, but the IP address is changed to be that of the printer.

The printer 151, after notifying of the transition into the sleep state, reads the machine information and the MIB database of its own, and transmits them to the substitute server 152, then bring itself to the sleep state. The machine information includes information such as paper size, whether it is portrait/landscape printing, printer IP/MAC addresses, printer mode information, and information on failure in setting of the printer cover or the printer doors. The MIB database is a virtual database called "Management Information Base", which is able to define objects on basic system information in the agent, and stores interface information for connecting the agent to the network.

The substitute server 152 stores information sent from the printer, and performs on behalf of the printer in relation to the other terminals (i.e. impersonate the printer), as long as the printer is kept in the sleep state. Suppose at time T3, a request frame ordering to set the tray size to A4, is transmitted from the printer management terminal 153 to the printer. The network interface unit 1521 of the substitute server 152 judges that the target IP address in the frame is addressed to the server itself. The substitute server 152 takes the frame in, interprets the request, and set the request content to the substitute machine information and to the substitute MIB database stored inside. At time T4, the substitute server 152 responds to the printer management terminal.

Suppose at time T5, an operation is directed to the printer and the printer is released from the sleep state. Then the printer notifies the substitute server of the fact. The substitute server transmits the stored machine information and the MIB data to the printer. The printer receives the information and overwrites, with this information, the machine information and the MIB database. By this operation, while the printer is in a sleep state, the request received at the substitute server, from the printer management terminal will be responded.

Then the substitute server, without delay, notifies the network management terminal that the impersonating transaction is cancelled. By this notification, the content of the address management table of the network management terminal will be changed to that shown in FIG. 18A. Thenceforth, request frames addressed from the printer management terminal to the printer will reach the printer.

Next, the transaction that the substitute server performs for the entire system is described. The substitute server always monitors any event occurrence shown in Steps S171-S174. Then, receiving, from the printer, a notification that the printer is being brought to the sleep state (event 1), the substitute server requests to start impersonating transaction to the network interface unit 1521 (S175), and transmits mail notifying that the substitute server will replace the IP address of its own with that for the printer (S176). Then, the substitute-processing flag is set (S177). Once receiving a request to start impersonating transaction, the network interface unit 1521 starts taking, into its own server, frames that have the printer IP address as the target IP address thenceforth.

When the machine information and the MIB data is transferred, as an event, from the printer (S172), the substitute server 152 stores the received information and the data into the substitute machine information 1524 and in the MIB substitute database 1525(S178).

Further, data addressed to the printer 151 arrives as another event, the substitute server 152, under condition that the substitute-processing flag is set (S179), receives the data and performs protocol-analysis (S180), and depending on the request, either stores the data in the substitute MIB database 1525, or obtains the data from the substitute MIB database 1525(S181), and transmits a response (S182).

Further, if the event is a notification from the printer informing that the printer will be released from the sleep state (S174), the substitute server 152 asks the network interface unit 1521 to cancel the impersonating processing (S183), and transmits impersonate cancel mail to the network management terminal (S184). The substitute server 152 transfers the stored substitute machine information and the substitute MIB data to the printer (S185), then resets the substitute-processing flag (S186).

The printer 151 stores the substitute machine information and the substitute MIB data in the original place by overwriting. This enables the printer to have data which takes into account the requests sent from the other terminals during the substitute-processing, which further enables the printer to respond to the requests.

What is claimed is:

1. A printing system comprising:
    a printer;
    a first network which is connected to the printer and through which a printing instruction is given to the printer; and
    a second network which is connected to the printer and through which an activation instruction is given to the printer,
    wherein the printer comprises:
    a print control unit which is connected to the first network and controls printing operation of the printer according to the printing instruction received through the first network; and
    a power management unit connected to the second network, which is supplied power when an activation instruction is received through the second network, which then starts activating.

2. The printing system of claim 1,
    wherein the second network is a power line.

3. The printing system of claim 1, further comprising
    a server connected to the first and second networks, which performs service to a terminal on the first network, on behalf of the printer while the printer is in a sleep state.

4. The printing system of claim 3,
    wherein the server routes the printer activation instruction from the first network to the second network.

5. The printing system of claim 1,
    the printer further comprising:
    a first network interface through which the print control unit is connected to the first network; and
    a second network interface through which the power management unit is connected to the second network,
    wherein when the printer is in the sleep state, power is shut off against all of the first network interface, the printer control unit, and the power management unit, keeping the second network interface supplied power.

6. The printing system of claim 5,
    wherein when a predetermined signal is inputted to the second network interface, power is supplied to the first network interface, the printer control unit, and to the power management unit.

7. A printing system in which a printer and a server are connected to a network,
    wherein the printer comprises:
    a print control unit connected to a first network, which controls printing operation of the printer, when receiving a printing instruction through the first network;
    a power management unit connected to a second network, which is supplied power when an activation instruction is received through the second network, which then starts activating the print control unit;
    a sleep-mode set unit for bringing the printer to a sleep state, by shutting off power against main function units of the printer including a network interface unit; and
    a machine information transfer unit for transferring, to the server, machine information of the printer which is most recent when being brought to the sleep state,
    and the server comprises
    a substitute-processing unit for, when a terminal on the network has requested service to the printer to inform of a machine state of the printer, performing the service on behalf of the printer in the sleep state using the transferred machine information; and
    a router which is connected to the first and second networks and which routes, to the second network, an activation instruction directed to the printer over the first network from the terminal.

8. The printing system of claim 7,
    wherein the machine information includes at least one of: an IP address of the printer; a MAC address of the printer; information of paper set in a tray; mode-set information; and door failure information.

9. The printing system of claim 7,
    wherein the substitute-processing unit sets the printer IP address to an IP address of the server, receives a request directed to the printer from the terminal, and responds to the request on behalf of the printer.

10. The printing system of claim 7,
    wherein the substitute-processing unit, when receiving a notification that the printer has been released from the sleep state, transfers the machine information, back to the printer, which is used while performing the service on behalf of the printer.

11. A printer connected at least to a first network and a second network, comprising:
- a print control unit connected to the first network, which controls printing operation of the printer, when receiving a printing instruction through the first network; and
- a power management unit connected to the second network, which is supplied power when an activation instruction is received through the second network while the printer is in a sleep state, which then starts activating the print control unit.

12. The printer of claim 11, wherein the second network is a power line.

13. A server used in a printing system in which a printer is connected at least to a first network and a second network, the server comprising:
- a detect unit for detecting whether the printer is in a sleep state;
- a substitute-processing unit for performing service, when the detect unit has detected that the printer is in the sleep state, to a terminal on the first network on behalf of the printer; and
- a router which is connected to the first and second networks and which routes, to the second network, an activation instruction directed to the printer over the first network from the terminal.

14. The server of claim 13, wherein the second network is a power line.

15. The server of claim 13, further comprising:
- a reception unit for receiving, from the printer, machine information of the printer,
- wherein the substitute-processing unit performs the service on behalf of the printer using the received machine information.

16. The server of claim 15, wherein the substitute-processing unit, when receiving a notification that the printer has been released from the sleep state, transfers the machine information, back to the printer, which is used while performing the service on behalf of the printer.

17. The server of claim 13, wherein the substitute-processing unit sets an IP address of the printer to an IP address of the server, receives a request directed to the printer from the terminal, and responds to the request on behalf of the printer.

18. A substitute-processing method which makes a server perform service on behalf of a printer, the server being used in a printing system in which the printer is connected at least to a first network and a second network,
the substitute-processing method including:
- a detecting step for detecting whether the printer is in a sleep state;
- a substitute-processing step for performing service on behalf of the printer to a terminal on the first network, when having detected that the printer is in the sleep state; and
- a routing step for routing, to the second network, an activation instruction directed to the printer from the terminal.

19. A substitute-processing method which makes a server perform service on behalf of a printer, the server being used in a printing system in which the printer is connected at least to a first network and a second network,
the substitute-processing method including:
- a detecting step for detecting whether the printer is in a sleep state;
- a receiving step for receiving, from the printer, machine information of the printer, and
- a substitute-processing step for performing service on behalf of the printer to a terminal on the first network, when having detected that the printer is in the sleep state, by using the received machine information.

20. A substitute-processing method which makes a server perform service on behalf of a printer, the server being used in a printing system in which the printer is connected at least to a first network and a second network,
the substitute-processing method including:
- a detecting step for detecting whether the printer is in a sleep state; and
- a substitute-processing step for performing service on behalf of the printer to a terminal on the first network, when having detected that the printer is in the sleep state, wherein the substitute-processing step sets an IP address of the printer to an IP address of the server, receives a request directed to the printer, and responds to the request on behalf of the printer.

21. A server that executes a program for making the server operate in a printing system in which a printer is connected to at least a first network and a second network,
the program making the server perform:
- a detecting step for detecting whether the printer is in a sleep state;
- a substitute-processing step for performing service, when the printer has been detected to be in the sleep state, on behalf of the printer to a terminal on the first network; and
- a routing step for routing, to the second network, an activation instruction directed to the printer from the terminal.

22. A printer comprising:
- a first network interface for receiving print data from a first network;
- a print control unit for controlling printing operation of the printer so as to print the received print data;
- a power management unit for supplying power to the first network interface and to the print control unit; and
- a second network interface for making the power management unit start supplying the power, when receiving a predetermined signal from a second network while the printer is in a sleep state.

23. The printer of claim 22, further comprising
a switch used for supplying power to the power management unit,
wherein the second network interface, when receiving the predetermined signal, turns the switch on.

24. The printer of claim 22, wherein the second network is a power line.

25. A printing system in which each of a printer and a server is connected to at least to a first network and a second network,
wherein the printer comprises:
- a first network interface for receiving print data through the first network;
- a print control unit for controlling printing operation of the printer so as to print the received print data;
- a power management unit for supplying power to the first network interface and to the print control unit; and
- a second network interface for making the power management unit start supplying the power when receiving a predetermined signal through the second network, and the server comprises:

a third network interface for receiving, through the first network, an activation instruction given by a terminal;

a fourth network interface for transmitting, when the third network interface has received the activation instruction, a predetermined signal to the second network interface;

a storage unit for storing thereon a frame which the terminal transmits after transmitting the activation instruction; and a transferring unit for transferring, when the activation of the printer has been completed, the stored frame to the printer.

26. The printing system of claim 25, the printer further comprising a switch used for supplying power to the power management unit, wherein the second network interface, when receiving the predetermined signal, turns the switch on.

27. The printing system of claim 25, wherein the second network is a power line.

28. The printing system of claim 25, the server further comprising an instruction unit for 1) instructing, to the terminal, to suspend the frame transmission when the printer activation has been completed, and 2) instructing, to the terminal, to re-start the frame transmission when the transferring unit has completed the transfer of the stored frame.

29. A printing system in which a printer and a server are connected to a network, wherein the printer comprises:

a print control unit connected to a first network, which controls printing operation of the printer, when receiving a printing instruction through the first network;

a power management unit connected to a second network, which is supplied power when an activation instruction is received through the second network, which then starts activating the print control unit;

a sleep-mode set unit for bringing the printer to a sleep state;

a first notification unit for notifying the server of the printer being brought to the sleep state;

a first transfer unit for transferring, when the printer is brought to the sleep state, machine information of the printer to the server; and a second notification unit for notifying the server of the printer having been released from the sleep state, and the server comprises:

a storage unit for storing thereon the received machine information;

a response unit for responding to a request directed to the printer from a terminal on the network, using the stored machine information;

a second transfer unit for transferring the stored machine information back to the printer, when receiving the notification of the printer having been released from the sleep state; and a router which is connected to the first and second networks and which routes, to the second network, an activation instruction directed to the printer over the first network from the terminal.

* * * * *